June 12, 1945.   H. J. McCREARY   2,378,311
RECTIFIER FOR CHANGEOVER WORK
Filed Aug. 6, 1940

INVENTOR.
Harold J. McCreary.

Patented June 12, 1945

2,378,311

UNITED STATES PATENT OFFICE 2,378,311

RECTIFIER FOR CHANGE-OVER WORK

Harold J. McCreary, Lombard, Ill., assignor to Automatic Electric Laboratories Inc., Chicago, Ill., a corporation of Delaware Application August 6, 1940, Serial No. 351,652

8 Claims. (Cl. 175—363)

The present invention relates in general to rectifiers and the object of this invention broadly stated is to provide a special relay with the "heavy filament type rectifier tube," which relay depends for its operation on the resistance and hence the temperature of the filament and which relay operates to speed up the heating of the filament and likewise to act as a time relay in the application of the plate voltage.

A special object of this invention is to provide a rectifier unit to best cooperate with other electrical power equipment to which it will be connected.

Another special object of this invention is the use of a heavy filament type cathode so that the variation of heating of the cathode or emitting surface with each cycle does not affect the emission appreciably since the temperature remains practically constant when once heated. It is therefore practical with such a rectifier tube to heat all cathodes of a three phase rectifier with one single phase filament transformer.

The foregoing and other objects and features of my invention will be pointed out more in detail hereinafter, reference being had to the accompanying drawing in which:

Fig. 1 is a practical method of paralleling four rectifier units in a bridge circuit to supply D. C. current from a single phase A. C. source.

Figure 4:
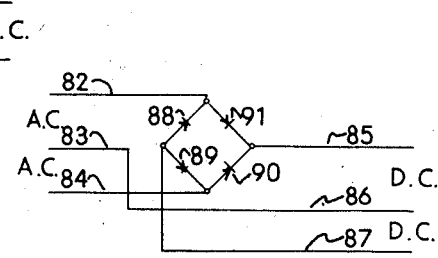

Fig. 4 is a practical method of using the rectifier units to supply a three wire D. C. system from a three wire A. C. Edison system.

Figure 5:
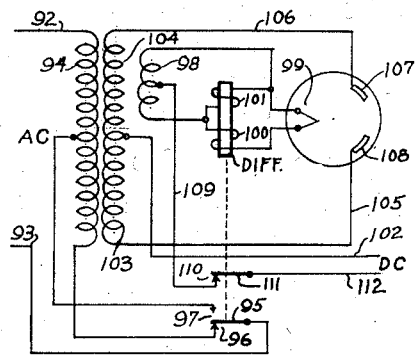

Fig. 5 is a relay connection on a conventional type rectifier to speed up the cathode heating and delay the application of plate potential until the cathode is heated.

Figure 6:
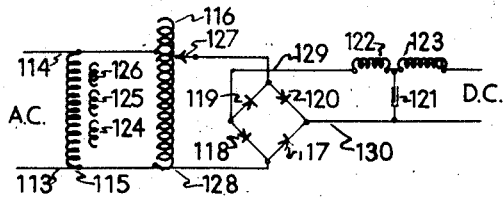

Fig. 6 is an arrangement of my invention which has been found particularly useful for laboratory purposes where an efficient source of D. C. with variable voltage is desired.

Figure 1:
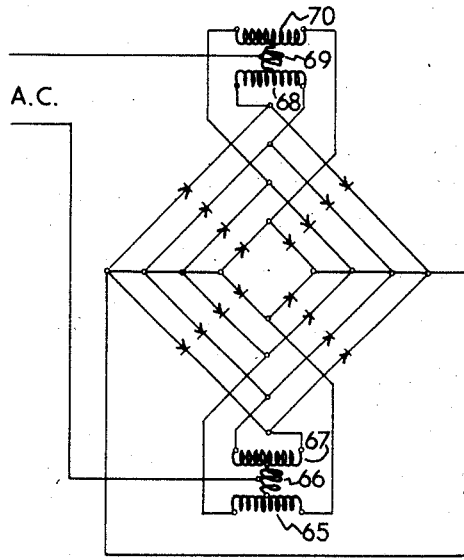

Referring now to Fig. 1 this shows the use of six balance coils 65, 66, 67, 68, 69 and 70 to cause four rectifier units such as shown to properly divide the load.

Figure 2:
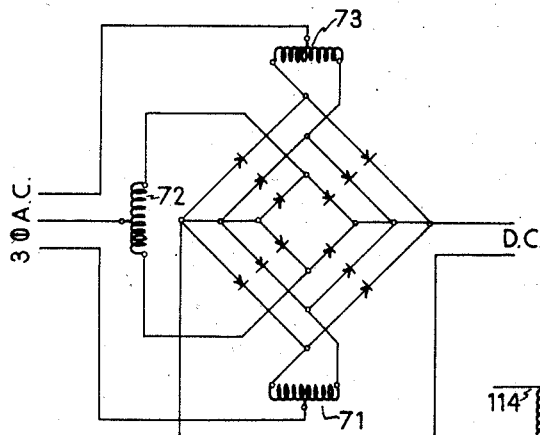
Fig. 2 is a practical method of paralleling two rectifier units in a bridge circuit from a three phase A. C. source.

Referring now to Fig. 2 this shows the use of three balance coils to parallel two three phase units so that the tubes will all properly divide the load.

Figure 3:
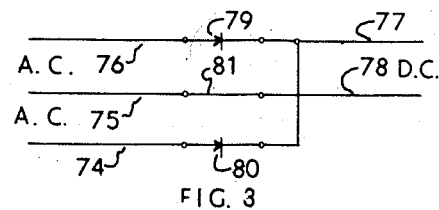
Fig. 3 is a practical method of using rectifier units with a 3 wire Edison circuit to give full wave rectification.

Referring now to Fig. 3 a three wire Edison system is connected to wires 74, 75 and 76 and supplies the wires 77 and 78 full wave rectified D. C. power of half the voltage between 74 and 76. 79 and 80 are rectifier tubes. 81 is a strap.

Referring now to Fig. 4, 82, 83 and 84 are the three wire A. C. Edison system supplying for example 240 volts alternating current between wires 82 and 84 and 120 volts between wires 82 and 83 or 83 and 84. This is rectified by the tubes 88, 89, 90 and 91 and supplies rectified 240 volts across wires 85 and 87 while rectified 120 volts D. C. appears across wires 85 and 86 or 86 and 87.

Referring now to Fig. 5, this is the conventional full wave rectifier of the one filament two anode type and shows a very novel circuit and relay arrangement for quickly heating the filament and delaying the application of plate potential applied to it. 92 and 93 are the wires from the A. C. power supply and current flows to energize the transformer primary 94 through the relay armature 95 and contact 96 or 97. The transformer secondary 98 energizes the filament 99 through a series or current winding of the relay 100 and the voltage across the filament is also applied to the relay voltage winding 101. The magneto motive forces of relay windings exactly cancelling each other (when the filament is heated to the proper temperature and thus has a definite resistance). A wire 102 is connected to the center of the secondary plate voltage windings 103 and 104 and to the output terminals, the outer leads 105 and 106 of the plate voltage windings are connected to plates 107 and 108 of the rectifier tube. A center tap wire 109 of the filament winding of the transformer is connected to a relay contact 110 which is closed by the armature 111 when the relay windings 100 and 101 release, closing D. C. power to wire 112 and the other output terminal.

Referring now to Fig. 6 this is a combination of elements to produce a rectifier of great utility for delivering a direct current of any desired variable voltage without a great waste of energy. 114 and 113 are the leads to a standard alternating current power supply, 115 is the filament transformer with secondaries 124, 125 and 126 for heating filaments. 116 is a variable auto transformer, which supplies an A. C. voltage of any desired value between the variable tap 127 and the wire 128 connected to the bridge rectifier 117, 118, 119 and 120 and D. C. voltage is supplied to the wires 129 and 130. This power travels then through choke 122 where a filter condenser 121 is tied on and then through another choke 123 so that the full wave pulsating D. C. is effectively smoothed out. It has been found that a filter such as this is very desirable in fact indispensable for some applications where certain arc lamps or business machines are powered from a rectifier.

While certain specific forms of construction have been shown herein for convenience in clearly explaining the principles of my invention it will be understood that modifications may be made and in fact have been made to fit the situations as required. I do not wish to be limited therefore to the specific uses or constructions shown and described, but desire to include and secure the protection of Letters Patent for all forms and modifications of the invention that come within the scope of the appended claims.

What I claim is:

1. A hot cathode rectifier normally requiring an appreciable time to heat the cathodes and in combination a relay which operates when a certain filament temperature is reached which supplies added energy and causes the cathode to become heated very quickly and when heated to the proper point as determined by the cathode resistance and temperature, cuts off the added energy and closes the plate circuits to the load.

2. A rectifier comprising a transformer with a center tapped secondary and center tapped tertiary, a hot cathode rectifier with two anodes, a differential relay, the transformer primary being connected to an alternating current power source, the secondary end terminals being connected to the anodes of the rectifier tube and its center tap supplying direct current to a load, said tertiary being connected to the thermionic filament through the control relay and its center tap supplying direct current to a load, the relay being of a differential type which operates as a function of the thermionic filament temperature as indicated by its resistance of which the ratio of current to voltage in the coils of a relay is a function.

3. An electric translating circuit comprising a source of current, a load circuit, means including an electric valve for controlling the flow of energy from said source to said load circuit, said valve being provided with a heatable cathode, and means for heating said cathode and controlling its temperature comprising multiple tap voltage ratio adjusting means for heating said cathode from said source, and means responsive to variations in the cathode electrical resistance for changing taps of said voltage ratio adjusting means to compensate for the effect of such variations.

4. In a rectifier containing a thermionic rectifier tube with a cathode heating filament which is heavy and rugged and therefore usually requiring an appreciable time to heat and which filament is composed of a material having a very high temperature coefficient of resistance, in combination with a differential type of relay, the windings of which are connected with the cathode heating filament so that it will be released when the ratio of filament voltage to filament current becomes a certain predetermined value, said relay changing certain taps of a transformer supplying power to said filament from a certain starting value of current to an operating value of current at the instant said predetermined ratio is reached, said relay closing the plate circuit of the rectifier tube to the load circuit when said predetermined ratio is reached.

5. A combination with a resistance element whose resistance varies with temperature and means for varying the temperature and consequently the resistance of said element, of a relay having a voltage coil and a current coil connected to said element, said relay operated due to the action of said windings when the resistance of said element reaches a predetermined value due to a temperature change therein, and means controlled by said relay for controlling the resistance of said element.

6. The combination with a thermionic tube having a filament and a source of current connected in circuit with said filament, of a differential relay having a current coil connected in series with said circuit and a voltage coil connected across the terminals of said filament, said windings being balanced as to magneto-motive force when a certain ratio of current to voltage exists in said filament, and means controlled by the operation of said relay when its windings are balanced to control the flow of current in said circuit.

7. The combination with a thermionic tube having a plate circuit, and a filament connected in a circuit with a source of current, which filament changes its resistance with temperature and thus its ratio of filament current to filament voltage, of a differential relay operated when said ratio reaches a predetermined point, and means controlled by the operation of said relay for reducing the current flow in said filament circuit, and for closing said plate circuit.

8. A thermionic tube having a plate circuit and a filament circuit and means for varying the temperature of said filament to thereby change the actual electrical resistance of said filament, in combination with a control relay connected directly to said filament and operated as a direct function of the resistance of the filament as controlled by the temperature thereof, and means controlled by the operation of said relay for controlling said plate circuit to close the same after the filament has reached the proper temperature.

HAROLD J. McCREARY.